US009529821B2

(12) United States Patent
Eshel et al.

(10) Patent No.: US 9,529,821 B2
(45) Date of Patent: Dec. 27, 2016

(54) COORDINATED ACCESS TO A CLUSTERED FILE SYSTEM'S SHARED STORAGE USING SHARED-LOCK ARCHITECTURE

(71) Applicant: INTERNATIONAL BUSINESS MACHINES CORPORATION, Armonk, NY (US)

(72) Inventors: Marc Eshel, San Jose, CA (US); Dean Hildebrand, Sumas, WA (US); Frank B. Schmuck, Campbell, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 13/630,754

(22) Filed: Sep. 28, 2012

(65) Prior Publication Data
US 2014/0095544 A1    Apr. 3, 2014

(51) Int. Cl.
*G06F 15/16* (2006.01)
*G06F 17/30* (2006.01)

(52) U.S. Cl.
CPC .............................. *G06F 17/30194* (2013.01)

(58) Field of Classification Search
CPC ................ G06F 17/30171; G06F 17/30; G06F 17/30194; G06F 17/30197; G06F 17/30224; G06F 17/30203; H04L 67/1097; H04L 45/46; H04L 61/1552
USPC .......................... 709/229, 224, 200, 203, 217
See application file for complete search history.

(56) References Cited

U.S. PATENT DOCUMENTS

| 5,987,506 | A | 11/1999 | Carter et al. |
| 6,826,570 | B1 * | 11/2004 | Eshel ................ G06F 17/30171 |
| 7,313,557 | B1 * | 12/2007 | Noveck |
| 7,730,057 | B2 | 6/2010 | Bell et al. |
| 7,966,343 | B2 | 6/2011 | Yang et al. |
| 8,589,550 | B1 * | 11/2013 | Faibish et al. ................ 709/226 |
| 2004/0133577 | A1 * | 7/2004 | Miloushev .......... G06F 11/1076 |
| 2009/0019098 | A1 * | 1/2009 | Gunda et al. ................. 707/205 |
| 2010/0293140 | A1 | 11/2010 | Nishiyama |
| 2011/0222442 | A1 | 9/2011 | Cole et al. |
| 2012/0066191 | A1 * | 3/2012 | Chang et al. ................. 707/704 |

(Continued)

OTHER PUBLICATIONS

"IBM Scale Out Network Attached Storage Concepts", IBM.com/redbook, Nov. 2010.*

(Continued)

*Primary Examiner* — El Hadji Sall
(74) *Attorney, Agent, or Firm* — Mohammed Kashef (57) ABSTRACT

Embodiments of the invention relate to coordinated access to a clustered file system's shared storage subsystem using a shared-lock architecture. A particular file server is configured to coordinate the file system's file access layout particular server, in response to a client's file access layout request for byte-ranges of a file stored in the storage subsystem being received by a file server in cluster and sent to said particular server, generates a file access layout of a set of file servers for a parallel file access protocol to use and byte ranges of the file that particular individual file servers to use, to service an I/O request for the file. The file server (that received the request), sends the generated file access layout to said client, and requests coordinated access to said file from the particular server in response to receiving an I/O request to byte-ranges of said file.

19 Claims, 7 Drawing Sheets

(56) References Cited

U.S. PATENT DOCUMENTS

2013/0110904 A1* 5/2013 Okita .................. H04L 67/06
709/203

OTHER PUBLICATIONS

IBM, Method for Easy Statistical View of Storage Disk Technology in Storage Servers and Virtulized Storage Farms, published in IP.com, Inc., IPCOM000188346D, Oct. 1, 2009, pp. 1-4.

R. Alimi et al., "A Survey of In-Network Storage Systems (RFC6392)", published in IP.com, Inc., IPCOM000213091D, Oct. 1, 2011, pp. 1-89.

Yin Wang et al., "Proportional-Share Scheduling for Distributed Storage Systems", 5th USENIX Conference on File and Storage Technologies (FAST'07), Feb. 2007, pp. 1-14.

* cited by examiner

COORDINATED ACCESS TO A CLUSTERED FILE SYSTEM'S SHARED STORAGE USING SHARED-LOCK ARCHITECTURE

CROSS-REFERENCE TO RELATED APPLICATIONS

This application is related to commonly assigned U.S. patent application Ser. No. 13/630,861 entitled "SUPPORTING COORDINATED ACCESS TO A FILE SYSTEM'S SHARED STORAGE USING AUTOMATIC ALIGNMENT OF A PARALLEL FILE ACCESS PROTOCOL AND METADATA MANAGEMENT," and U.S. patent application Ser. No. 13/630,684 entitled "COORDINATED ACCESS TO A FILE SYSTEM'S SHARED STORAGE USING DYNAMIC CREATION OF FILE ACCESS LAYOUT," both of which are filed concurrently with the present application and incorporated herein by reference in their entirety.

BACKGROUND

Embodiments of the invention relate to the field of data storage, and in particular, to coordinated access to a clustered file system's shared disk storage subsystem by using a shared-lock architecture.

Data access in cloud architectures is beginning to center around scale out storage systems. For example, IBM SONAS™ (Scale Out Network Attached Storage™) is a storage scale out NAS offering designed to manage vast repositories of information in enterprise cloud computing environments requiring very large capacities (e.g., petabytes), high levels of performance, and high availability. IBM SONAS is built using the IBM General Parallel File System™ (GPFS™), a clustered file system high-performance enterprise file management platform that supports scalable and parallel cluster computing. The scale out storage systems thereby allows applications to access a single file system, storage device, single portion or data, or single file through multiple file servers in a cluster.

Third-party file access protocols are commonly used for remote access to file system data (e.g., FTP and HTTP). Most of these protocols are client-server based, with a single client accessing a single storage server. These protocols strangle the scalability of scale-out storage systems, and frequently cause data access bottlenecks, by limiting access to a single server. Coordinated and parallel file access protocols have been developed to simultaneously access multiple file servers in a remote cluster. These protocols help relieve storage bottlenecks, but their access must be coordinated by the storage system to maintain data access semantics (e.g., POSIX) and avoid corruption.

Parallel Network File System (pNFS) is a standardized parallel file access protocol extension of Network File System (NFS) protocol. pNFS is expected to be supported in most scale out storage systems in the future. pNFS, an integral part of NFSv4.1, transforms NFSv4 into a heterogeneous metadata protocol. pNFS clients and servers are responsible for control and file management operations, but delegate I/O functionality to a storage-specific layout driver on the client. pNFS clients can fully saturate the available bandwidth of the parallel file system by separating control and data flows. Each storage system may support pNFS or any similar parallel file access protocols in different ways. For example, to determine a specific file layout for I/O access, each storage system will have unique ways of creating an optimal layout to reduce latency and maximize I/O throughput.

BRIEF SUMMARY

An aspect of the invention includes a method, clustered file system, and computer program product of coordinated access to a clustered file system's shared disk storage subsystem by using a shared-lock architecture. The file system includes a cluster of plurality of file servers where active file servers in the cluster have equivalent access to shared data of the file system. The file system further includes a shared disk storage subsystem that stores said file system's shared data.

In one embodiment, a particular file server (among servers in the cluster) is configured to coordinate the file system's file access layout. The particular server, in response to a client's file access layout request for byte-ranges of a file stored in the storage subsystem being received by a file server in cluster and sent to said particular server, generates a file access layout of a set of file servers for a parallel file access protocol to use and byte ranges of the file that particular individual file servers to use, to service an I/O request for the file.

The file server (that received the file access layout request), sends the generated file access layout to said client, and then requests coordinated access to said file from the particular server in response to receiving an I/O request to byte-ranges of said file. The particular server validates that no file servers in said cluster have conflicting access to said file, byte ranges for the I/O requested are consistent with the generated file access layout, and the file server (that received the I/O request) is the correct file server for byte ranges of the requested I/O based on the generated file access layout. If validated then the particular file server (configured to coordinate byte ranges) grants the file server (that received the initial I/O request) coordinated access to the byte ranges of the file.

Details of the embodiments of the invention are described below in the Detailed Description section in reference to the accompanying drawings. The Brief Summary is intended to provide an overview of the claimed subject matter and is not intended to limit the scope of the claimed subject matter. Other features and advantages of this invention will become apparent from the following Detailed Description.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

The following Detailed Description of the embodiments of the system, method, and computer program product of the present invention, as presented in the Figures, is not intended to limit the scope of the invention, as claimed, but is merely representative of selected embodiments of the invention. The architecture of the present invention, as generally described and illustrated in the Figures herein, may be arranged and designed in a wide variety of different configurations. Thus, the following Detailed Description is intended only by way of example, and simply illustrates certain selected embodiments of systems and processes that are consistent with the invention as claimed herein.

Embodiments of the invention provide a method, clustered file system, and computer program product of coordinated access to a clustered file system's shared disk storage subsystem by using a shared-lock architecture. For example, GPFS uses byte-range locks to track which nodes are writing to which part of a file, enabling deterministic updates between nodes as well as ensuring readers on other nodes are seeing the latest updates. This coordination can cause a lot of inter-storage server communication, which can reduce performance and impede the original goal of improving I/O performance.

Further, when a single piece of data is accessed through multiple storage nodes, e.g., a file block in a file system, a distributed lock manager must coordinate access to avoid data corruption. In addition, in many storage systems, false sharing can occur when clients access separate byte ranges within a single block from multiple nodes. Even though the clients are not accessing overlapping byte ranges, their access must be coordinated and possibly serialized through several RPC messages with the lock manager. For example, writing to a single clustered file system block from multiple file servers in parallel has undefined behavior if not coordinated. In this example, if a first file server writes part of a first block, it is placed in the file system cache. Later, if a second file server writes data to that first block, some of which overlaps with data written from the first file server, then the first file server's data must be written prior to the second file server. Similar if the second file server reads data from that block, it must see the first server's data.

GPFS tracks what file servers have access to what data blocks of a file to serialize and coordinate updates to a given file. If a file server requests a byte-range that conflicts with a byte-range held by another file server, then the server with the conflicting byte-range must flush its data to disk and relinquish access. One problem is that requesting and relinquishing access to byte-ranges can cause overhead as the number of file servers increase in a file server cluster that support an underlying file system. For example, pNFS stripes data at a fine-grained level (e.g., 1 MB) across all GPFS servers, which results in many requests and revokes.

Embodiments of the invention provide methods of improving the I/O performance of coordinated and parallel file access protocols by reducing the amount of inter-storage server network coordination. With the invention, the file access protocol and scale-out file system agree upon a specific data access pattern. As long as the writer honors the agreement, the storage servers do not need to coordinate file access, increasing I/O performance.

Beyond the novelty of this disclosure, it is intended to protect GPFS support of pNFS. pNFS is currently a technology preview in RHEL6.2 and is intended to be fully supported in the near future. With 10+ storage companies planning to implement pNFS support, it is important that GPFS not lose the ability to optimize its implementation.

This invention allow file access protocols to maintain file system semantics between multiple storage servers while not requiring the use of byte-range locks/tokens. With the invention, every file access protocol accesses each piece of data through a single storage server. This means byte-range lock network communication can be avoided since clients access each piece of data through a single storage server. When this happens, the storage server can coordinate access to the piece of data locally, with minimal (if any at all) network communication. On every I/O request, the server can validate if the client is using the agreed upon access pattern and is accessing the correct storage server. If a client does not follow the agreed upon access pattern, coordination with the distributed lock manager will resume.

Figure 1:
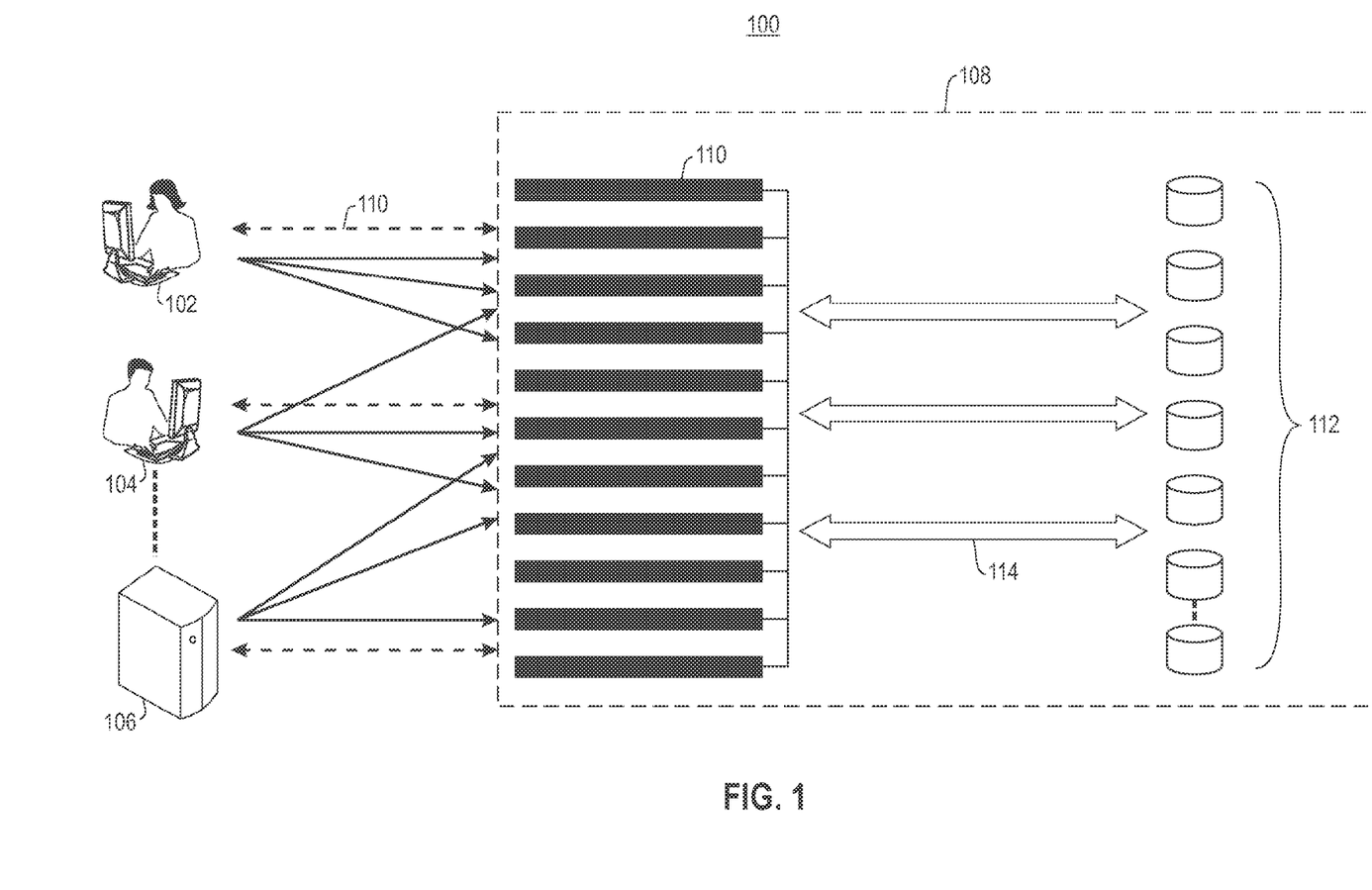
FIG. 1 depicts a diagram illustrating an exemplary file server cluster for running a clustered file system with parallel access to shared storage that implements embodiments of the invention, according to one embodiment.

FIG. 1 depicts a diagram (100) illustrating an exemplary file server cluster (108) (hereinafter "cluster") for running a clustered file system (hereinafter "file system") with parallel access to a shared disk storage subsystem (112) (hereinafter "storage subsystem") that implements embodiments of the invention, according to one embodiment. The file system supports coordinated access to the file system's storage subsystem using dynamic creation of file access layout for different workloads and access patterns. The diagram includes file based parallel file access protocol clients (e.g., pNFS) (102, 104 . . . 106) that remotely access the file system (hereinafter "clients"). For example, the clients may include a parallel file access protocol AIX® client (102), a WINDOWS client (104), and a Linux client (104). The clients send and receive data and metadata to and from the cluster over a network (108) (e.g., wide-area network (WAN)).

The cluster includes a plurality of servers (110), including but not limited to state, data, or storage servers (hereinafter "file servers"), working in parallel to serve the file access protocol clients' I/O requests. The "file servers" may include any server (or virtual server) that is part of the storage system and can be used by external applications to access data stored in the storage system. For example, file servers include servers (e.g., IBM System x® servers) configured to support file access protocol client access to a file system's storage. The cluster further includes a storage subsystem (112). In one embodiment, the storage subsystem is scalable (e.g., scale-out storage system). For example, scale-out storage system NAS solutions such as IBM SONAS™, IBM XIV® and IBM Storwize® V7000 disk systems that support over 7,000 disk drives. The file servers are in communication with the storage subsystem over a network (114) (e.g., local area network (LAN) or fiber channel (FC)).

Figure 2:
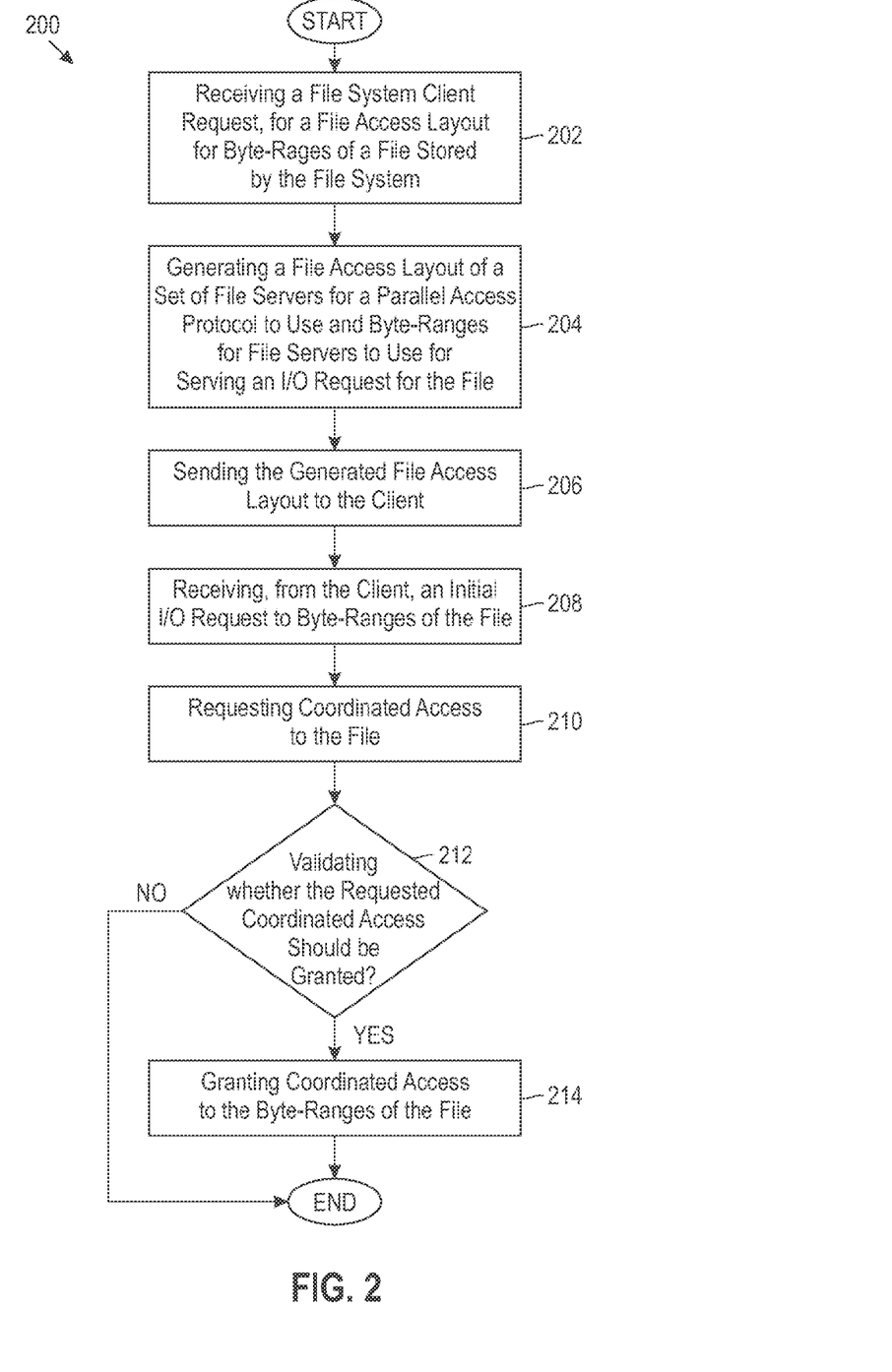
FIG. 2 depicts a flowchart illustrating a first process for a file system to coordinate access to a shared disk storage subsystem of a file server cluster by using a shared-lock architecture, according to one embodiment.

FIG. 2 depicts a flowchart (200) illustrating a first process for a file system to coordinate access to a storage subsystem of a cluster by using a shared-lock architecture, according to one embodiment. In this embodiment, the file server uses the shared-lock architecture to serve an initial I/O request from a client (hereinafter "the client") for byte-ranges of a file (hereinafter "the file"). A file server (among the file servers in cluster) receives an initial file client request (hereinafter "the server") for a file access layout for byte-ranges of a file stored by the file system in the storage subsystem (step 202). In one embodiment, a particular file server in the cluster is configured to coordinate the file system's file access layout. That particular file server serves as the file system's byte-range coordinator. In other embodiments, one or more other file servers in the cluster may be configured (e.g., computer programmed) to coordinate the file system's file access layout. For example, a particular file server in the cluster may be configured to coordinate the file system's file access layout for a particular file or set of files.

The file system sends that initial request to the byte-range coordinator. The byte-range coordinator then generates (i.e., calculates) a file access layout of a set of file servers for a parallel file access protocol to use and byte ranges of the file that individual file servers among the set (of file servers in the cluster) to use to service I/O requests for that file (step 204). The file server that received the initial I/O request may or may not be in that set. The server then sends the generated file access layout to the client (that sent the request) (step 206). The server then receives, from the client (that requested the file access layout), an initial I/O request to byte-ranges of the file (step 208). The server then requests coordinated access to the file from the byte-range coordinator (step 210).

The byte-range coordinator then validates whether the requested coordinated access should be granted (step 212). The byte-range coordinator validates that: (i) no other file servers in the cluster have conflicting access to the file; (ii) byte ranges for the I/O requested are consistent with the generated file access layout, and (iii) the server is the correct file system file server for byte ranges of the requested I/O based on the generated file access layout (step 212). If not validated, then coordinated access is not granted to the byte-ranges of the file and the method ends. If validated, then the byte-range coordinator grants the server coordinated access to the byte-ranges of the file (step 214). The file system granting coordinated access thereby allows the server to perform I/O to all byte-ranges of the file without further communication with the byte range coordinator. The server then retains the coordinated access until the byte range coordinator revokes the granted access.

Figure 3:
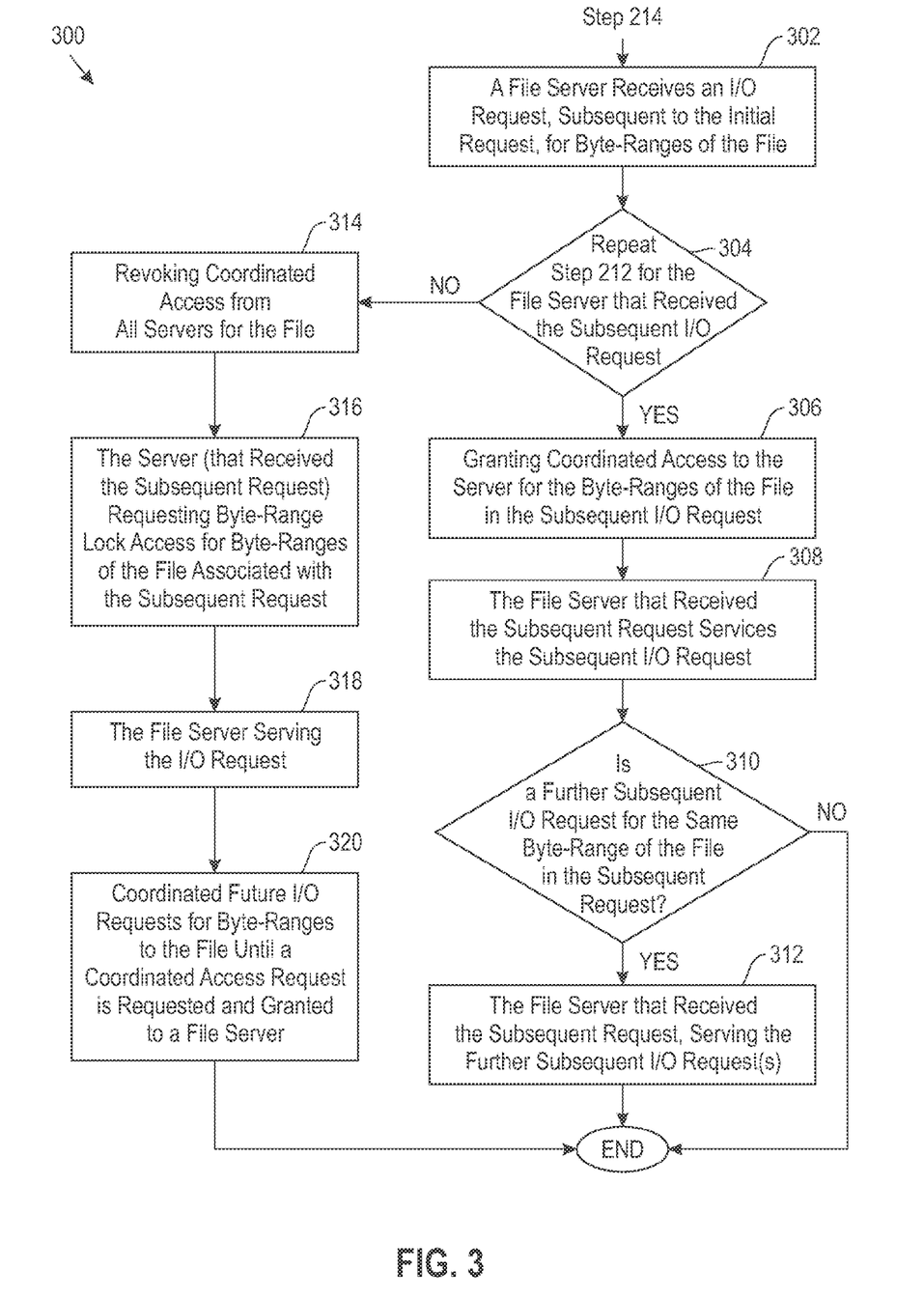
FIG. 3 depicts a flowchart illustrating a second process for a file system to coordinate access to a shared disk storage subsystem of a file server cluster by using a shared-lock architecture, according to one embodiment.

FIG. 3 depicts a flowchart (300) illustrating a second process for a file system to coordinate access to a storage subsystem of a cluster by using a shared-lock architecture, according to one embodiment. In this embodiment the file system uses the shared-lock architecture to serve an I/O request received by a file server (in the cluster) from a client for byte-ranges of the file, in which the I/O request being subsequent to an initial request for the byte-ranges from the client. The second process continues from step 214.

A file server in the cluster receives an I/O request from a client, subsequent to the initial I/O request, for byte-ranges of the file (step 302). The file system then repeats the validating process (see step 212) for the file server (that received the subsequent request) (step 304) (hereinafter "that server"). If that server is validated for the subsequent I/O request, then the byte-range coordinator grants coordinated access to that server for the byte-ranges of the file in the subsequent request (step 306). The granted coordinated access thereby enables that server to service the subsequent I/O request (step 308).

Next, the process determines if there are further subsequent I/O requests requested for the same byte-ranges of the file in the subsequent request (step 310). The process ends if there are not any further subsequent I/O requests (requested for the same byte-ranges of the file in the subsequent request). If there are further sequent I/O requests (requested for the same byte-ranges of the file in the subsequent request), that server serves further subsequent I/O requests for the same byte-ranges to the file without further communication with the byte range coordinator (to coordinate the file system's byte ranges) (step 312).

If that server is not validated for the subsequent I/O request (see step 304), then the byte-range coordinator revokes coordinated access from all servers for the file (step 314). That server then requests byte-range lock access for byte-ranges of the file (step 316). In one embodiment, the request will get queued up and satisfied in order based on the file system's security checks. The granted byte-range lock access thereby enables that server to service the subsequent I/O request (step 318). Future I/O requests for byte-ranges to the file are coordinated by the file system until a coordinated access request for byte-ranges to the file is requested and granted to a different file server (in the cluster) (step 320).

Figure 4:
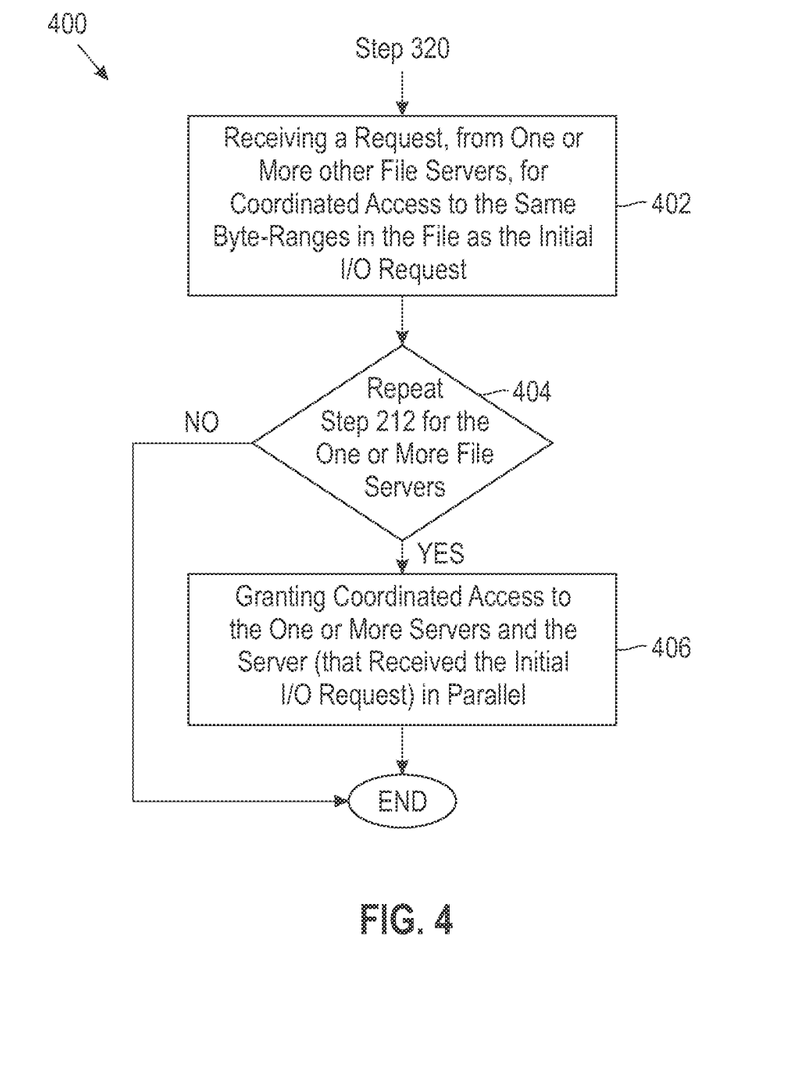
FIG. 4 depicts a flowchart illustrating a third process for a file system to coordinate access to a shared disk storage subsystem of a file server cluster by using a shared-lock architecture, according to one embodiment.

FIG. 4 depicts a flowchart illustrating a third process (400) for the file system to coordinate access to the storage subsystem of the cluster by using a shared-lock architecture. In this embodiment, the file server uses the shared-lock architecture to serve a request for coordinated access from one or more file servers for one or more other clients to the same byte-ranges of the file specified in the initial request. The third process proceeds following step 320.

The byte-range coordinator receives a request, from one or more other file servers, for coordinated access to the same byte-ranges (i.e., with the same parameters) in the file as requested in the initial I/O request (step 402). The byte-range coordinator performs the validation (see step 212) for the one or more other file servers (step 404). If the server does not already have coordinated access for the byte-range, the byte-range coordinator grants coordinated access to the one or more other file servers and the server that received the initial I/O request. In one embodiment, the byte-range coordinator grants coordinated access to the one or more other file servers and the server that received the initial I/O request in parallel and in the order they are received from file servers in the cluster. For servers that already have coordinated access for the byte-ranges (granted by the byte-ranged coordinator) those servers do not re-request additional coordinated access, but the file server does re-validate (see step 212) because coordinated access can not be used if the I/O does follow the file layout.

In a pNFS file system implementation embodiment, on the first I/O to a file by a client, the file server sends a message to the file system's byte-range coordinator that the client is accessing the file using pNFS. If existing clients have requested access to byte-ranges of the same file, the byte-range coordinator informs them that pNFS is going to occur on the file. If they no longer need access, they simply release their access. If they continue to need access, then all file servers must also use byte-range locks. The client retains pNFS access to file until revoked by byte-range coordinator.

On subsequent pNFS I/O to a file for a client, the file system validates that the pNFS client is using the correct file server for the I/O byte-range with pNFS layout. If I/O access complies with layout, the file server serves the I/O request. If I/O access does not comply with layout (such as requests from non pNFS clients such as NFSv3, SMB, HTTP, direct GPFS access), all file servers use byte-range locks. The byte-range coordinator then informs all clients that they must give up their special coordinated access. Then, all file servers work with GPFS byte-range coordinator to get byte-range locks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "manager," or "system." Furthermore, aspects of the present invention may take the form of a computer program product embodied in one or more computer readable medium(s) having computer readable program code embodied thereon.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires; a portable computer diskette; a hard disk; a random access memory (RAM); a read-only memory (ROM); an erasable programmable read-only memory (EPROM or Flash memory); an optical fiber; a portable compact disc read-only memory (CD-ROM); an optical storage device; a magnetic storage device; or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
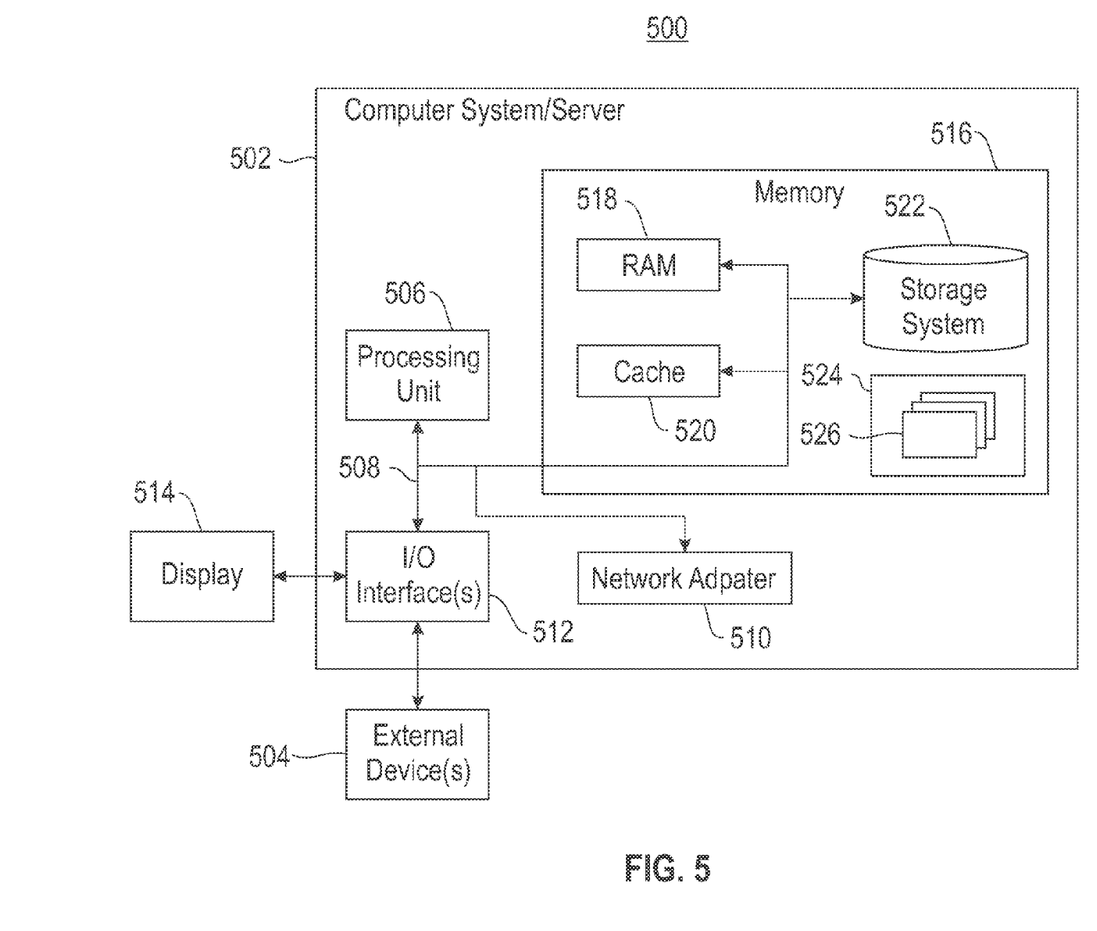
FIG. 5 depicts a block diagram illustrating an exemplary general-purpose computing architecture for implementing embodiments of the present invention.

FIG. 5 depicts a block diagram illustrating an exemplary general-purpose computing architecture (500) for implementing embodiments of the present invention. For example, the computer architecture is suitable as a cloud computing architecture and for implementing and/or performing any of the functionality or embodiments of the invention as described and claimed herein.

The architecture includes a computer system/server (502) (hereinafter "computer"). The components of the computer may include, but are not limited to, one or more processors or processing units (506), a system memory (516), and a bus (508) that couples various system components together, including the system memory to the processing units. The computer can serve as a cloud computing code and is operational with numerous other general purpose or special purpose computing system environments or configurations.

Examples of well-known computing systems, environments, and/or configurations that may be suitable for use with the computer include, but are not limited to: personal computer systems; server computer systems; thin clients; thick clients; hand-held or laptop devices; multiprocessor systems; microprocessor-based systems; set top boxes; programmable consumer electronics; network PCs; minicomputer systems; mainframe computer systems; clustered file systems; file server clusters; scalable storage subsystems; and distributed cloud computing environments that include any of the above systems or devices, and the like.

The bus represents one or more of any of several types of bus structures, including a memory bus or memory controller, a peripheral bus, an accelerated graphics port, and a processor or local bus using any of a variety of bus architectures. By way of example, and not limitation, such architectures include: Industry Standard Architecture (ISA) bus; Micro Channel Architecture (MCA) bus; Enhanced ISA (EISA) bus; Video Electronics Standards Association (VESA) local bus; and Peripheral Component Interconnects (PCI) bus. The computer typically includes a variety of computer system readable media. Such media may be any available media that is accessible by the computer, and it includes both volatile and non-volatile media, removable and non-removable media.

The system memory can include computer system readable media in the form of volatile memory, such as random access memory (RAM) (518) and/or cache memory (520). The computer may further include other removable/non-removable, volatile/non-volatile computer system storage media. By way of example only, a storage system or storage subsystem (522) can be provided for reading from and writing to a permanent storage (not shown and typically called a "hard disk drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory may include at least one program product having a set (e.g., at least one) of program modules that are configured to carry out the functions of embodiments of the invention.

The computer may be described in the general context of computer system-executable instructions, such as program modules, being executed by a computer system. Generally, the program modules may include routines, programs, objects, components, logic, data structures, and so on that perform particular tasks or implement particular abstract data types. The computer may be practiced in distributed cloud computing environments where tasks are performed by remote processing devices that are linked through a communications network. In a distributed cloud computing environment, the program modules may be located in both local and remote computer system storage media including memory storage devices.

The program/utility (524), having a set (at least one) of program modules (526), may be stored in the system memory or storage system by way of example, and not limitation, as well as an operating system, one or more application programs, other program modules, and program data. Each of the operating systems, one or more application programs, other program modules, and program data or some combination thereof, may include an implementation of a networking environment. Program modules generally carry out the functions and/or methodologies of embodiments of the invention as described herein.

The computer may also communicate with one or more external devices (504), such as a keyboard, a pointing device, a display (514), etc.; one or more devices that enable a user to interact with the computer; and/or any devices (e.g., network card, modem, etc.) that enable computer to communicate with one or more other computing devices. Such communication can occur via I/O interfaces (512). Still yet, the computer can communicate with one or more networks such as a LAN, a general WAN, and/or a public network (e.g., the Internet) via network adapter (510). As depicted, the network adapter communicates with the other components of the computer via the bus. It should be understood that although not shown, other hardware and/or software components could be used in conjunction with computer. Examples, include, but are not limited to microcode, device drivers, redundant processing units, external disk drive arrays, RAID systems, tape drives, and data archival storage systems, etc.

It is understood in advance that although this Detailed Description includes a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure comprising a network of interconnected nodes. By way of example, the cloud computing model may include at least five characteristics, at least three service models, and at least four deployment models.

Characteristics are as follows:

On-demand self service, where a cloud consumer can unilaterally provision computing capabilities, such as server time and network storage, as needed automatically without requiring human interaction with the service's provider.

Broad network access, where capabilities are available over a network and accessed through standard mechanisms that promote use by heterogeneous thin or thick client platforms (e.g., mobile phones, laptops, and PDAs).

Resource pooling, where the provider's computing resources are pooled to serve multiple consumers using a multi-tenant model, with different physical and virtual resources dynamically assigned and reassigned according to demand. For example, there is a sense of location independence in that the consumer generally has no control or knowledge over the exact location of the provided resources but may be able to specify location at a higher level of abstraction (e.g., country, state, or datacenter).

Rapid elasticity, where capabilities can be rapidly and elastically provisioned, in some cases automatically, to quickly scale out and rapidly released to quickly scale in. For example, to the consumer, the capabilities available for provisioning often appear to be unlimited and can be purchased in any quantity at any time.

Measured service, where cloud systems automatically control and optimize resource use by leveraging a metering capability at some level of abstraction appropriate to the type of service (e.g., storage, processing, bandwidth, and active user accounts). For example, resource usage can be monitored, controlled, and reported providing transparency for both the provider and consumer of the utilized service.

Service Models are as follows:

Software as a Service (SaaS), the capability provided to the consumer is to use the provider's applications running on a cloud infrastructure. The applications are accessible from various client devices through a thin client interface such as a web browser (e.g., web-based e-mail). For example, the consumer does not manage or control the underlying cloud infrastructure including network, servers, operating systems, storage, or even individual application capabilities, with the possible exception of limited user-specific application configuration settings.

Platform as a Service (PaaS), the capability provided to the consumer is to deploy onto the cloud infrastructure consumer-created or acquired applications created using programming languages and tools supported by the provider. For example, the consumer does not manage or control the underlying cloud infrastructure including networks, servers, operating systems, or storage, but has control over the deployed applications and possibly application hosting environment configurations.

Infrastructure as a Service (IaaS), the capability provided to the consumer is to provision processing, storage, networks, and other fundamental computing resources where the consumer is able to deploy and run arbitrary software, which can include operating systems and applications. For example, the consumer does not manage or control the underlying cloud infrastructure but has control over operating systems, storage, deployed applications, and possibly limited control of select networking components (e.g., host firewalls).

Deployment Models are as follows:

Private cloud, the cloud infrastructure is operated solely for an organization. For example, the private cloud may be managed by the organization or a third party and may exist on-premises or off-premises.

Community cloud, the cloud infrastructure is shared by several organizations and supports a specific community that has shared concerns (e.g., mission, security requirements, policy, and compliance considerations). For example, a community cloud may be managed by the organizations or a third party and may exist on-premises or off-premises.

Public cloud, the cloud infrastructure is made available to the general public to a large industry group and is owned by an organization selling cloud services.

Hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

Figure 6:
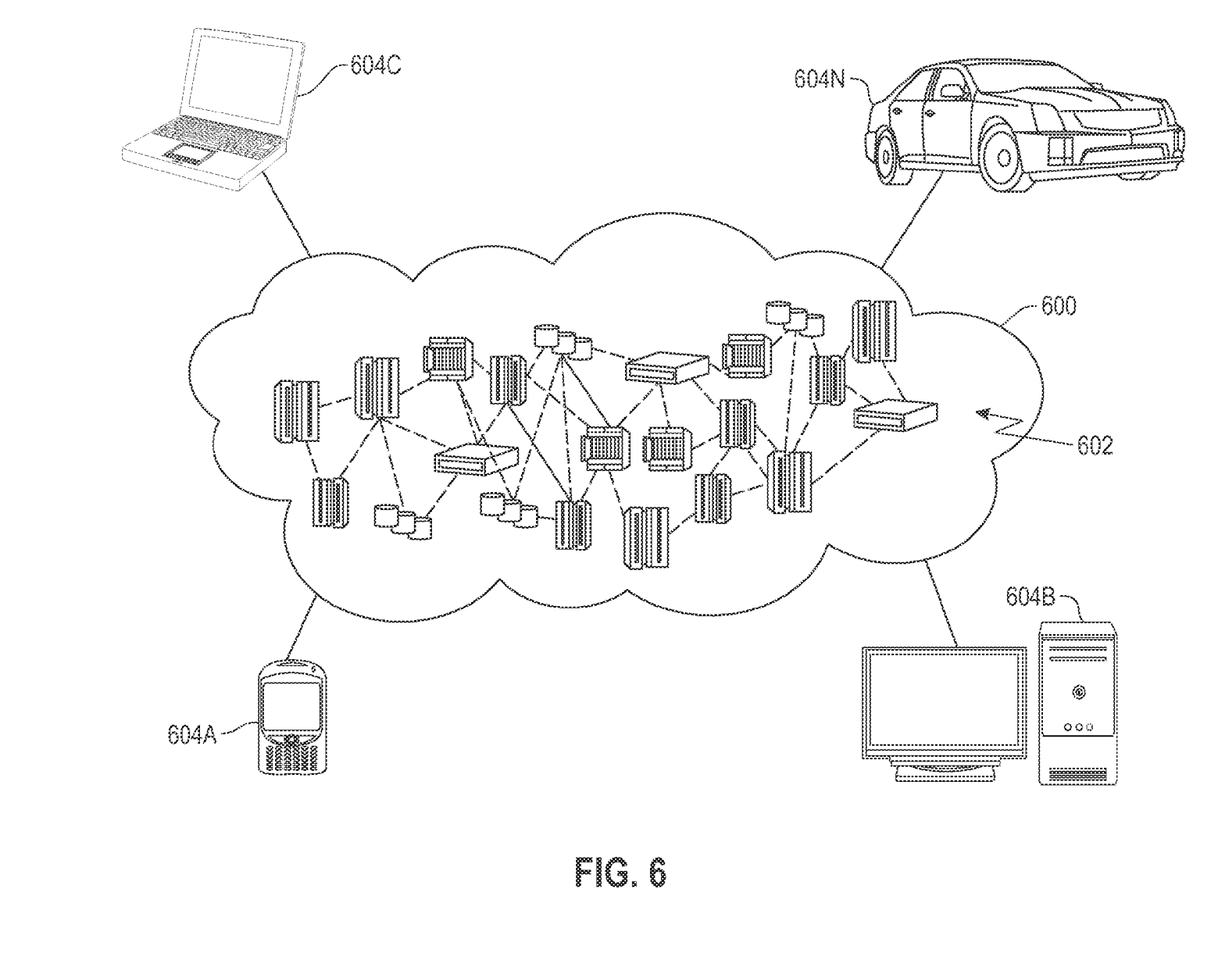
FIG. 6 depicts a block diagram illustrating an exemplary cloud computing environment, according to one embodiment.

FIG. 6 depicts a block diagram illustrating an exemplary cloud computing environment, according to one embodiment. As shown, cloud computing environment 700 comprises one or more cloud computing nodes 602 with which local computing devices used by cloud consumers, such as, for example, personal digital assistant (PDA) or cellular telephone 604*a*, desktop computer 604*b*, laptop computer 604*c*, and/or automobile computer system 604*d* may communicate. The nodes may communicate with one another. They may be grouped (not shown) physically or virtually, in one or more networks, such as private, community, public, or hybrid clouds as described hereinabove, or a combination thereof. This allows the cloud computing environment to offer infrastructure, platforms and/or software as services for which a cloud consumer does not need to maintain resources on a local computing device. It is understood that the types of computing devices shown in are intended to be illustrative only and that computing nodes and cloud computing environment can communicate with any type of computerized device over any type of network and/or network addressable connection (e.g., using a web browser).

Figure 7:
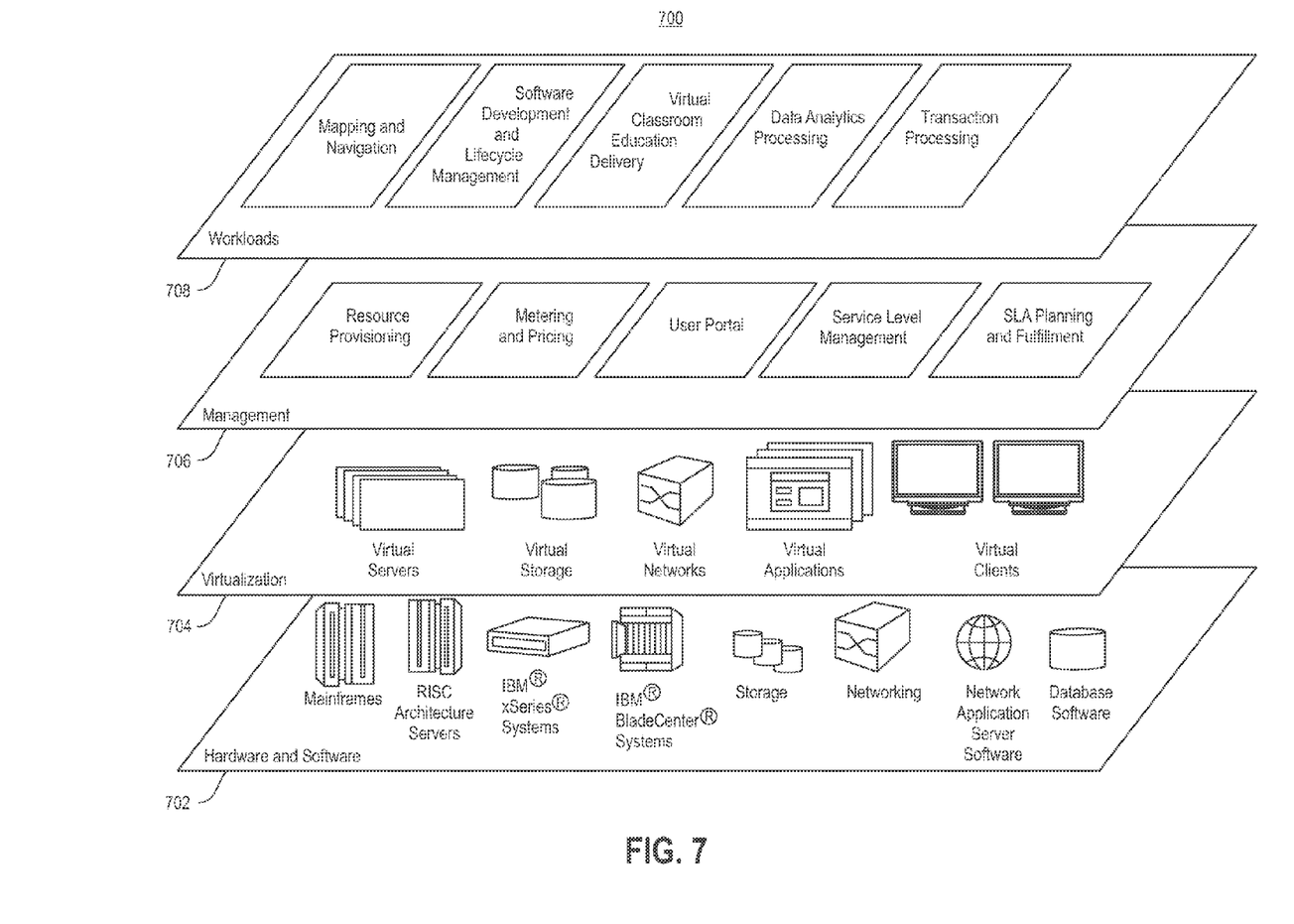
FIG. 7 depicts a block diagram illustrating exemplary abstraction model layers, according to one embodiment.

FIG. 7 depicts a block diagram illustrating exemplary abstraction model layers, according to one embodiment. It should be understood in advance that the components, layers, and functions shown in FIG. 8 are intended to be illustrative only and embodiments of the invention are not limited thereto. As depicted, the following layers and corresponding functions are provided:

Hardware and software layer 702 includes hardware and software components. Examples of hardware components include: mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include: network application server software; in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 704 provides an abstraction layer from which the following examples of virtual entities may be provided: virtual servers; virtual storage; virtual networks, including virtual private networks; virtual applications and operating systems; and virtual clients.

In one example, management layer 706 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 708 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to data item identification, including, but not limited to, of coordinated access to a clustered file system's shared disk storage subsystem by using a shared-lock architecture.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

What we claim is:

1. A method of coordinated file access using NFS (Network File System) protocol for metadata and I/O to a clustered file system's shared disk storage subsystem by using a shared-lock architecture, each active file server in the clustered file system having equivalent access to clustered file system's shared data, comprising:
   receiving a file access layout request from a client by a first file server in the clustered file system, using a NAS (Network-Attached Storage) protocol, for byte-ranges of a file stored by the file system;
   generating a file access layout of a set of file servers in the clustered file system for the NFS protocol to use and byte ranges of the file that particular individual file servers of the clustered file system among the set to use for servicing an I/O request for the file, wherein the generated file access layout functions as a shared-lock for the shared-lock architecture;
   sending the generated file access layout to the client;
   receiving from the client, an initial I/O request to byte-ranges of the file;
   requesting coordinated access to the file from a file system byte-range coordinator that coordinates distributed file system access to byte ranges of files by the file servers in the clustered file system;
   validating that: no file servers in said the clustered file system have conflicting access to the file, byte ranges for the I/O requested are consistent with the generated file access layout, and the first file server is the correct file server for byte ranges of the requested I/O based on the generated file access layout; and
   if validated, then granting the first file server coordinated file access to the requested byte-ranges of the file and any subsequent I/O requests that are validated with the generated file access layout can be used by the file servers in the clustered file for coordinated access.

2. The method of claim 1, wherein granting coordinated file access thereby allows the first file server (that received the initial I/O request) to perform I/O to all byte-ranges of the file without further communication with file system.

3. The method of claim 1, wherein the first file server retains the coordinated access until the byte range coordinator revokes the file access.

4. The method of claim 1, further comprising:
   when a second file server in in the clustered file system receives a I/O request from a client, subsequent to the first file server receiving the file access layout request, for byte-ranges of the file, and performing the validating for this file server.

5. The method of claim 4, further comprising:
   if the second file server is validated for the subsequent request, then granting coordinated file access to the second file server for the byte-ranges of the file for the subsequent request, and the second file server servicing that subsequent I/O request.

6. The method of claim 5, further comprising:
   when coordinated file access is granted to the second server, further subsequent I/O requests for said byte-ranges to the file are served by said server (that received said subsequent request) without further communication with the file system to coordinate the file system's byte ranges.

7. The method of claim 4, further comprising:

if the second server is not validated for the subsequent request, then the clustered file system: (i) revokes coordinated access from all servers in the cluster for the file, (ii) the second server requesting byte-range lock access for byte-ranges of the file associated with the subsequent request, (iii) if the second file server is granted access to the byte range, the second file server services the I/O request, and (iv) future I/O requests for byte-ranges to the file are coordinated by the clustered file system until a coordinated access request for byte-ranges to the file is requested by and granted to another file server.

8. The method of claim 1, further comprising:

if one or more file servers, other than the first file server, in the clustered file system requests coordinated file access to the same file prior I/O request, then repeating the validating for the one or more file servers; and if validated and the one or more file servers does not already have coordinated access for the byte-range, then granting the coordinated access to the one or more other file servers and the server that received the initial I/O request in an order I/O requests were received by the clustered file system.

9. The method of claim 1, further comprising:

if first file server is not validated, the first file server requests byte-range locks for file access for each I/O to the file, wherein the byte-range locks ensures updates and reads to the file from multiple file servers in clustered file system are synchronized.

10. The method of claim 9, wherein the byte range locks also ensure POSIX semantics are maintained.

11. The method of claim 1, wherein coordinated file access granted to a file server is retained until revoked by the clustered file system or returned to by that file server the access was granted to.

12. The method of claim 1, wherein the clustered file system ensures that the I/O performed by a file server to byte-ranges of a file is in a manner consistent with POSIX semantics.

13. A computer program product of coordinated file access using NFS (Network File System) protocol for metadata and I/O to a clustered file system's shared disk storage subsystem by using a shared-lock architecture, each active file server in the clustered file system having equivalent access to clustered file system's shared data, the computer program product comprising a non-transitory computer readable storage medium having computer usable program code embodied therewith, the computer program code being executable to:

receive a file access layout request from a client by a first file server in the clustered file system, using a NAS (Network-Attached Storage) protocol, for byte-ranges of a file stored by the file system;

generate a file access layout of a set of file servers in the clustered file system for the NFS protocol to use and byte ranges of the file that particular individual file servers of the clustered file system among the set to use for servicing an I/O request for the file, wherein the generated file access layout functions as a shared-lock for the shared-lock architecture;

send the generated file access layout to the client;

receive from the client, an initial I/O request to byte-ranges of the file;

request coordinated access to the file from a file system byte-range coordinator that coordinates distributed file system access to byte ranges of files by the file servers in the clustered file system;

validate that: no file servers in said the clustered file system have conflicting access to the file, byte ranges for the I/O requested are consistent with the generated file access layout, and the first file server is the correct file server for byte ranges of the requested I/O based on the generated file access layout; and if validated, then grant the first file server coordinated file access to the requested byte-ranges of the file and any subsequent I/O requests that are validated with the generated file access layout can be used by the file servers in the clustered file for coordinated access.

14. The computer program product of claim 13, the computer program code being further executable to:

when a second file server in in the clustered file system receives a I/O request from a client, subsequent to the first file server receiving the file access layout request, for byte-ranges of the file, and performing the validating for this file server.

15. The computer program product of claim 14, the computer program code being further executable to:

if the second file server is validated for the subsequent request, then granting coordinated file access to the second file server for the byte-ranges of the file for the subsequent request, and the second file server servicing that subsequent I/O request.

16. The computer program product of claim 15, the computer program code being further executable to:

when coordinated file access is granted to the second server, further subsequent I/O requests for said byte-ranges to the file are served by said server (that received said subsequent request) without further communication with the file system to coordinate the file system's byte ranges.

17. The computer program product of claim 14, the computer program code being further executable to:

if the second server is not validated for the subsequent request, then the clustered file system: (i) revokes coordinated access from all servers in the cluster for the file, (ii) the second server requesting byte-range lock access for byte-ranges of the file associated with the subsequent request, (iii) if the second file server is granted access to the byte range, the second file server services the I/O request, and (iv) future I/O requests for byte-ranges to the file are coordinated by the clustered file system until a coordinated access request for byte-ranges to the file is requested by and granted to another file server.

18. The computer program product of claim 13, the computer program code being further executable to:

if one or more file servers, other than the first file server, in the clustered file system requests coordinated file access to the same file prior I/O request, then repeating the validating for the one or more file servers; and if validated and the one or more file servers does not already have coordinated access for the byte-range, then granting the coordinated access to the one or more other file servers and the server that received the initial I/O request in an order I/O requests were received by the clustered file system.

19. The computer program product of claim 13, the computer program code being further executable to:

if first file server is not validated, the first file server requests byte-range locks for file access for each I/O to the file, wherein the byte-range locks ensures updates and reads to the file from multiple file servers in clustered file system are synchronized.

* * * * *